United States Patent [19]

Hallsten

[11] Patent Number: 5,526,620
[45] Date of Patent: Jun. 18, 1996

[54] TANK COVER STRUCTURE WITH ODOR EXHAUST SYSTEM

[75] Inventor: Jeffrey A. Hallsten, Sacramento, Calif.

[73] Assignee: Hallsten Corporation, Sacramento, Calif.

[21] Appl. No.: 425,610

[22] Filed: Apr. 20, 1995

[51] Int. Cl.⁶ .................................................... E04B 1/32
[52] U.S. Cl. ........................... 52/246; 220/565; 220/373; 454/49
[58] Field of Search ................................... 52/246, 302.1, 52/302.3; 454/49; 220/565, 373, 367.1, 366.1

[56] References Cited

U.S. PATENT DOCUMENTS 5,009,685  4/1991  Wilson et al. .................... 454/49 X
5,325,646  7/1994  Hallsten et al. ...................... 52/246
5,424,806  6/1995  Siegel ................................ 454/49 X

*Primary Examiner*—Carl D. Friedman
*Assistant Examiner*—David Jersen
*Attorney, Agent, or Firm*—Thomas M. Freiburger

[57] ABSTRACT

A substantially gas-tight tank cover is designed such that the structural beams of the cover serve also as a gas withdrawal system for removing odorous or deleterious gases from above the surface of a liquid in the tank, such as in the case of a sewage treatment plant. The structural beams are tubular in cross-sectional shape, and have openings at selected locations in communication with the interior of the tank above the liquid. The system efficiently uses the structure of the tank cover as part of the odorous gas withdrawal system.

3 Claims, 5 Drawing Sheets

5,526,620

TANK COVER STRUCTURE WITH ODOR EXHAUST SYSTEM

BACKGROUND OF THE INVENTION

This invention relates to covered tank structures generally. More specifically the invention is concerned with the withdrawal of noxious and/or odorous gases from a substantially sealed tank structure, as in many sewage treatment plants wherein such gases must be removed.

In many sewage treatment plants, the tanks in which sewage is stored or treated are subject to requirements that the tanks be substantially sealed against escape of noxious or odorous gases to the outside atmosphere. Such substantially closed tanks must be vented, with a slight negative pressure maintained inside, and this requires a system of venting conduits which are connected to an air pump or withdrawal device at a remote location, for pulling the noxious/odorous (and sometimes flammable) gases from above the surface of the liquid in the tank.

In the present invention described below, a portion of such gas withdrawal equipment is integrated with structural members of a tank cover of a particular design.

SUMMARY OF THE INVENTION

In accordance with the present invention, a tank cover structure spans over a tank adapted to contain a liquid, the tank cover structure forming a substantially gas-tight cover over the tank. The cover structure includes a noxious gas withdrawal system for exhausting gases associated with liquid or processes in the tank.

In the system of the invention the tank cover has one or more structural beams spanning across at least a portion of the distance spanned by the tank cover and supporting at least a portion of the tank cover. The beam has a closed, generally tubular cross section. A gas withdrawal means is connected to at least some of the beams so as to establish fluid communication with the interior of the beam. Openings are provided in the beam at selected locations, such openings communicating with the interior of the tank above the liquid.

In a preferred embodiment, the openings are located in at least one lateral side of the tubular cross section beam.

In one preferred form, the beam of the tank cover is substantially rectangular in cross sectional shape.

The gas withdrawal system of the invention may be incorporated in a sewage treatment tank system which also has an air delivery and bubbler system utilizing hollow structural beams of the cover structure as pressurized air conduits, as disclosed in a copending application filed concurrently with this application. In that case different structural beams are used for each air/gas handling system. However, the system disclosed herein can be used in sewage treatment tanks or other tanks which do not incorporate such an integrated air delivery system.

It is therefore among the objects of this invention to take advantage of the hollow structural beams of a tank cover structure in a preferred design, for withdrawing noxious, odorous and deleterious gases from a tank, particularly in the case of a sewage treatment plant. These and other objects, advantages and features of the invention will be apparent from the following description of a preferred embodiment, considered along with the accompanying drawings.

DESCRIPTION OF PREFERRED EMBODIMENTS

Figure 1:
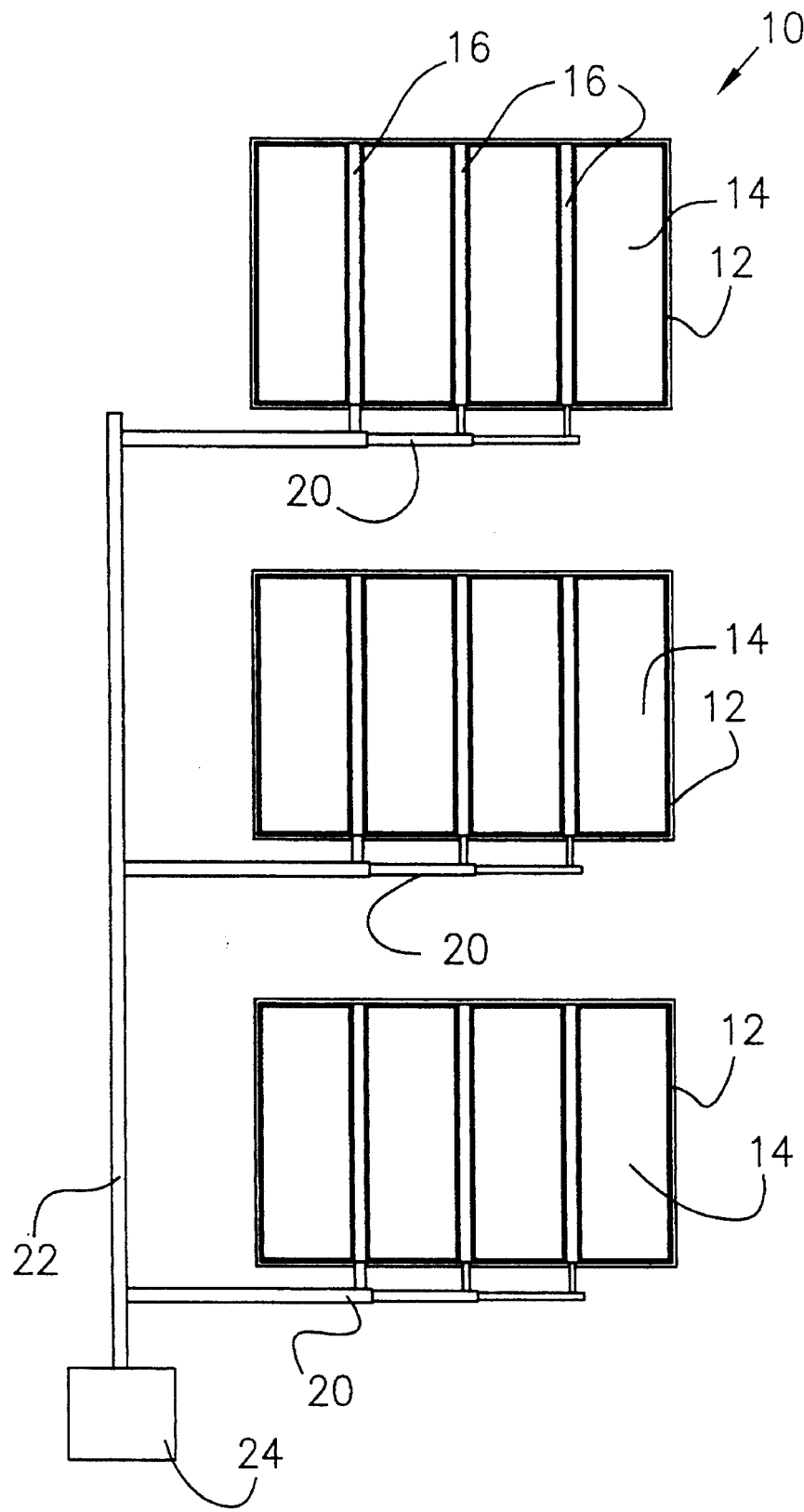
FIG. 1 is a schematic plan view showing a layout of gas withdrawal conduits in a system according to the invention.

FIG. 1 shows a schematic layout 10 which may be for a sewage treatment plant, wherein a liquid or slurry is contained within one or more tanks 12, enclosed by covers 14. The covers 14 may be generally of the type disclosed in U.S. Pat. No. 5,325,646 of Hallsten Corporation. That patent discloses a tank or channel cover structure wherein one or more extruded structural members, tubular in cross section, support a flat, arched or domed cover from the edges of a tank or channel, such as the tank 12. The cover structures disclosed in the patent are adaptable for many purposes, including sewage treatment plants.

In FIG. 1, tubular structural members are shown at 16 spanning across the tank 12 as main members of the support structure for the cover 14.

In accordance with this invention, the structural members 16 serve as gas withdrawal conduits for noxious, deleterious or flammable gases contained within the tank 12, above the level of liquid or slurry within the tank. FIG. 1 shows that each of the withdrawal conduits/structural members 16 is connected to a gas withdrawal trunk line 20, preferably at one end as shown. As illustrated schematically, the gas withdrawal trunk lines 20 serving the plurality of tanks are connected to a main suction line 22. This leads ultimately to an air pump or exhaust pump 24 which delivers the odorous, deleterious gas preferably to a filtration system, not shown.

Figure 2:
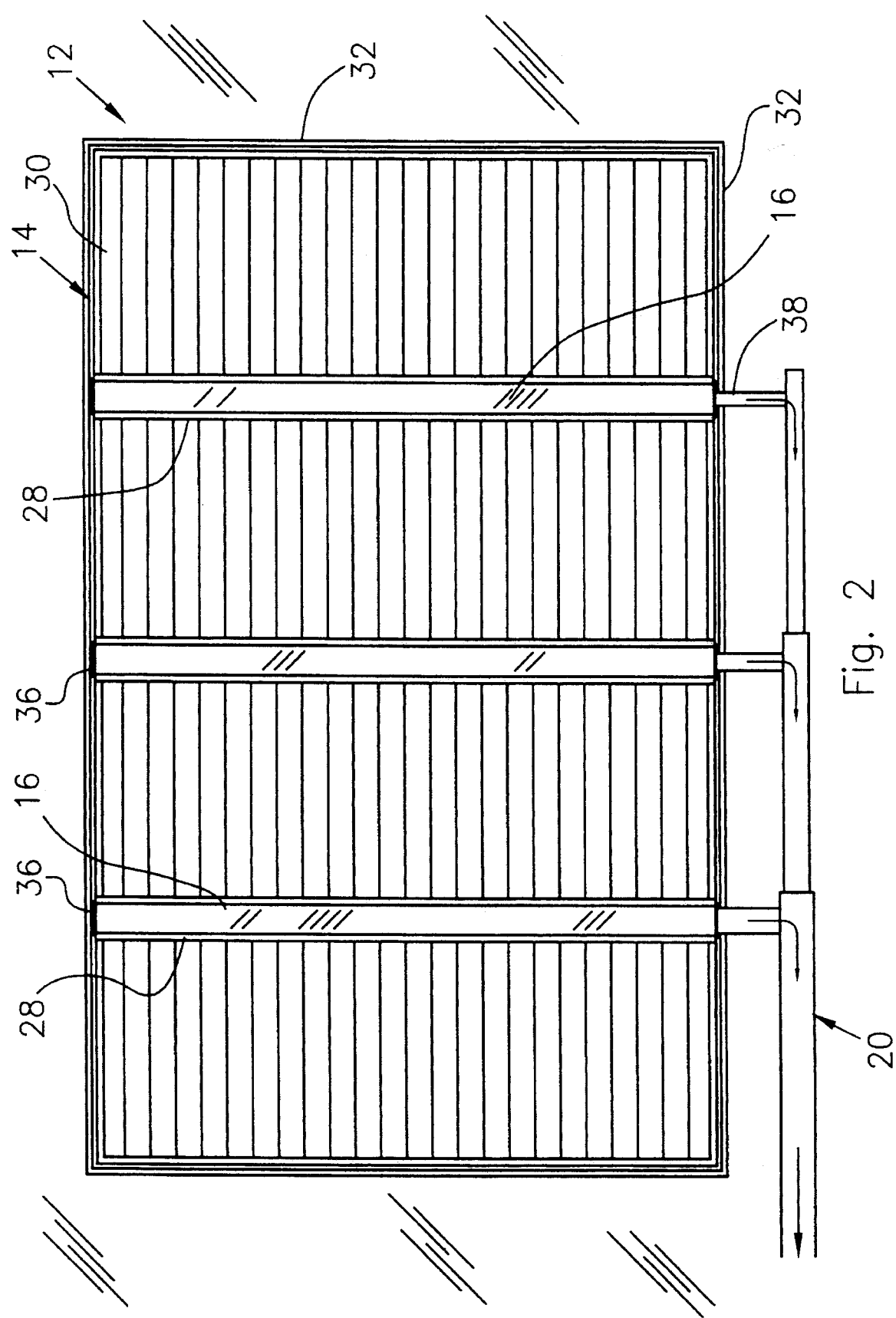
FIG. 2 is an enlarged and more detailed view, somewhat schematic, showing a rectangular tank with gas withdrawal means as in the invention.

FIG. 2 shows one of the tanks 12 in greater detail. Such a tank may typically be an in-ground concrete tank, liquid-impervious, within which air bubbling occurs in a sewage treatment plant, although other constructions and other applications are possible. In accordance with the principles of this invention, as explained above, the main structural beams 16 serve as gas withdrawal conduits for the gas evacuation system which is required in many tanks holding deleterious gases, such as in a sewage treatment plant. These structural beams 16, and connecting end members 28 and deck planks 30, preferably are as disclosed in U.S. Pat. No. 5,325,646, referenced above, and also in copending application Ser. No. 270,010, the disclosures of both of which are incorporated herein by reference. The structural beams 26 rest on fixed rim or ledge structure 32 of the tanks being sized to span across the width of the tank 12 and allowing for live load, preferably including persons walking on the tank cover assembly 14. As disclosed in the above referenced issued patent and application, the beams 16 are hollow, preferably formed of extruded aluminum. These beams 16 serve as conduits for gas withdrawal and are subjected to negative pressure through the withdrawal trunk line 20, being closed by caps 36 at remote ends and being closed except for a fitting flange 38 at the air withdrawal ends. The fittings 38 are sealed with the ends of the beams 16 and with the trunk line 20, which may comprise serially decreasing cross-sectional areas as it reaches each branch distribution line as indicated. Examples of the closure end caps 36 and fittings 38 will be discussed below.

Figure 3:
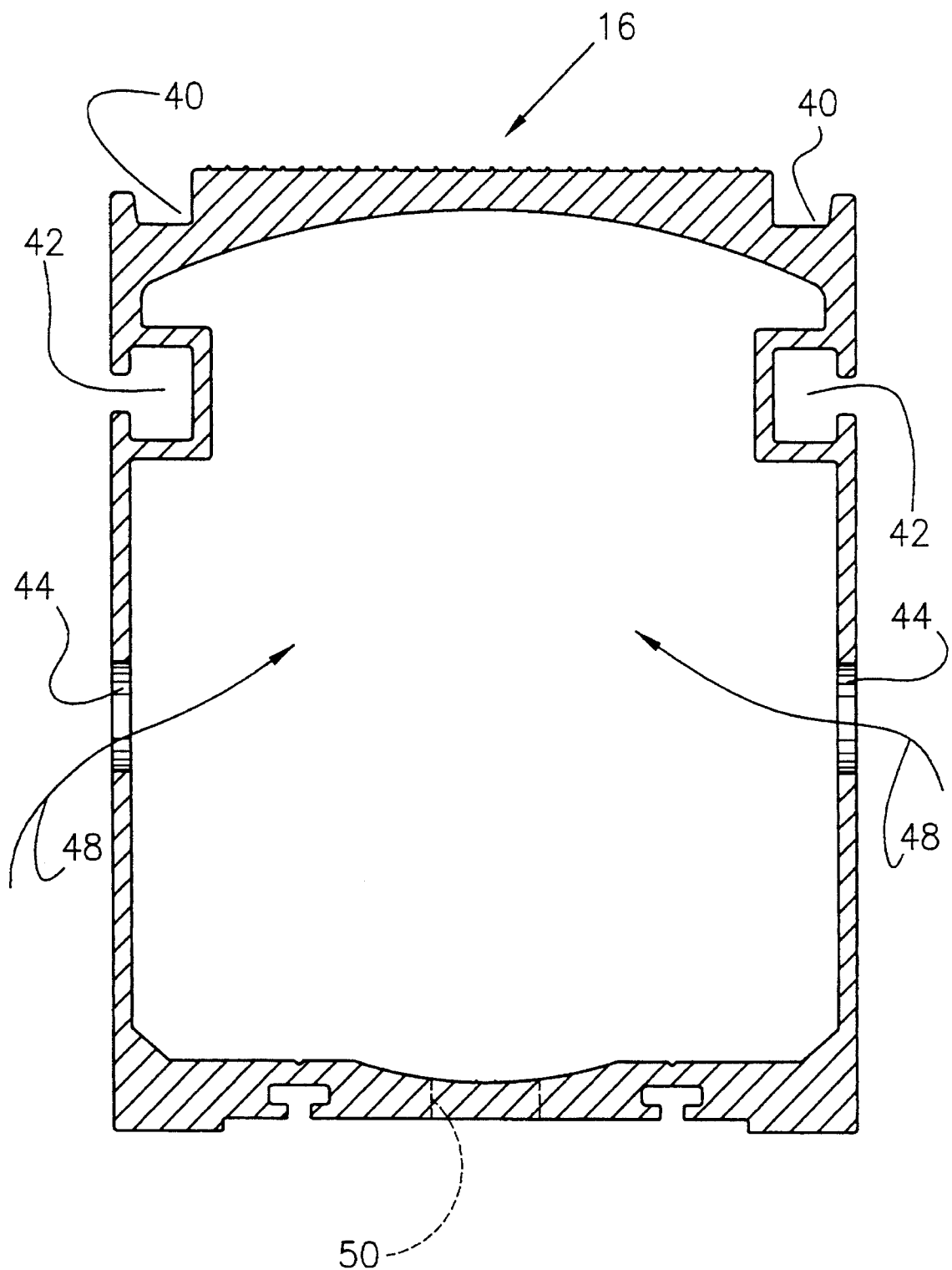
FIG. 3 is a cross-sectional view showing one form of structural beam for a cover of the tank, the beam being tubular in cross section, used as part of the gas evacuation system of the invention.

FIG. 3 shows in detail one embodiment of a structural beam 16 employed as a gas withdrawal member for the interior of a tank. The hollow structural beam 16 in this example is similar to what is shown in copending application Ser. No. 270,010, having a height which is considerably greater than side members which will be attached to this main structural member via recesses 40 and 42. As explained in the copending application, as well as in U.S. Pat. No. 5,325,646, the side members (not illustrated herein) are connected to the beam by hooking into the recess 40 and by insertion of a locking piece which binds the side member with the recess 42. This leaves sufficient depth of the beam 16 below the side member that holes 44 can be located in the sides of the beam 16, for unencumbered communication with the interior of the tank space. In FIG. 3 arrows 48 indicate the direction of gas flow into the interior of the tubular structural beam 16.

FIG. 3 also shows in dotted lines at 50, an alternative location for a gas opening in the beam 16, at the bottom of the beam. Beam structural considerations as well as air flow considerations will dictate whether the openings are located in the sides of the beams, as at 44, or in the bottom of the beams, as at 50, or both, and also the frequency of occurrence of these openings.

It should be understood that the beam 16 of FIG. 3 can be one of greater or lesser depth than what is illustrated. Thus, the beam 16 can follow the configuration of other structural beams shown in U.S. Pat. No. 5,325,646 and pending application Ser. No. 270,010. In the event the beam 16 is the same height as one or both side members connected to its sides, the gas withdrawal openings should be located in the bottom of the beam, as at 50 in FIG. 3.

Figure 4:
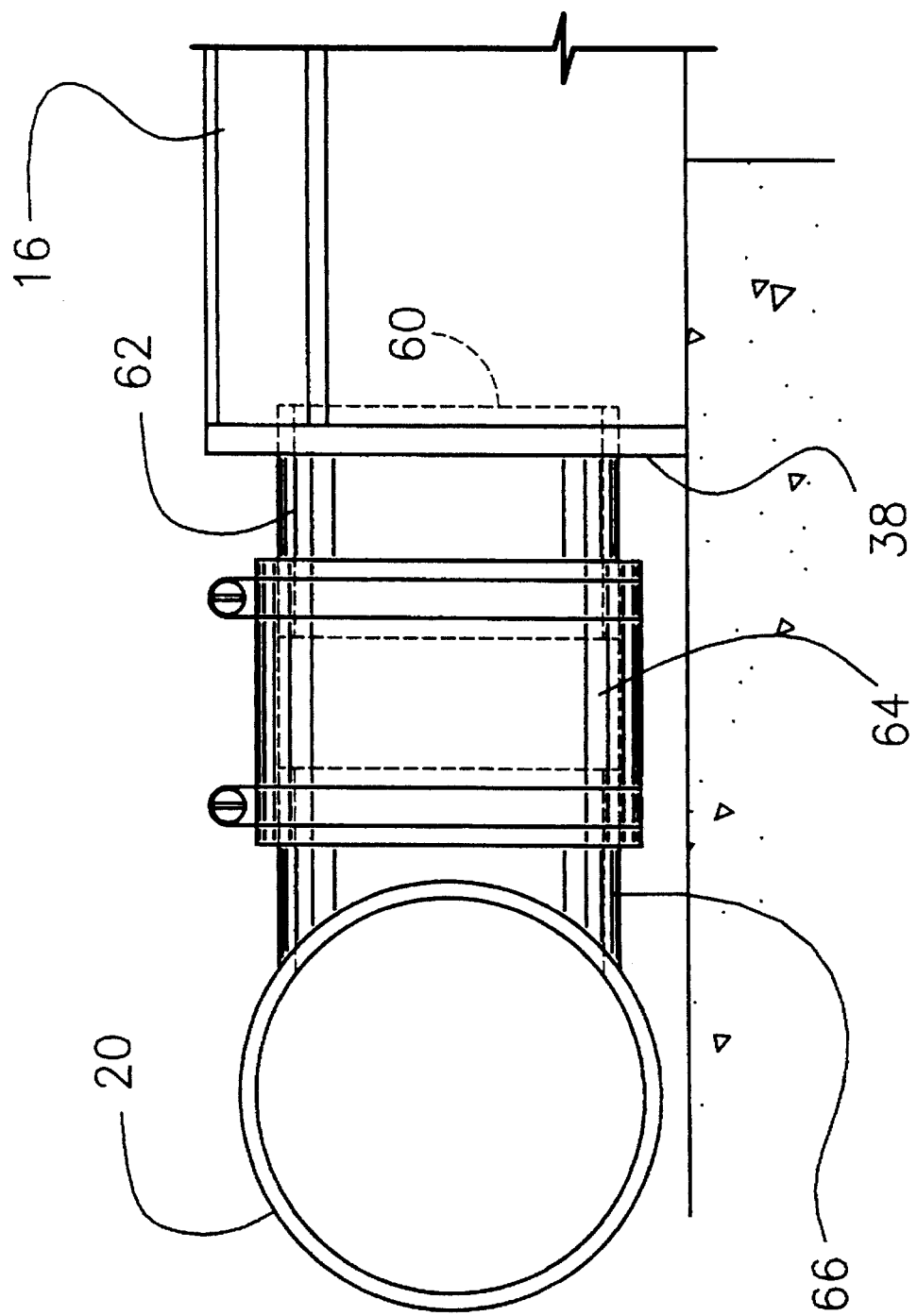
FIGS. 4 and 5 are detail views showing connections which can be made between exterior gas evacuation conduits and the structural beams of the tank cover structure.

FIG. 4 illustrates somewhat schematically an example of a connection between one of the exhausting or gas withdrawal beams 16 and a pipe or tube 20 which serves as a trunk line in the system, as shown in FIGS. 1 and 2. FIG. 4 illustrates that the structural beam 16 may be fitted with an elastomeric end stopper or plug 38 which is contoured to fit into the shape shown in cross section in FIG. 3. The end plug 38 may be formed of a rubber-modified plastic material or thermoplastic elastomer (TPE), one which is resistant to ultraviolet light, since the end of the structural member 16 will often be exposed to the elements. Welding of a metal plate or flange plate to the end of the beam 16 (preferably aluminum, since the beam 16 will usually be aluminum) is an alternative, as is screwing a plate into the end of the beam with bolts and tapped holes, and with a gasket positioned between the two components.

In any event, the trunk line 20 is connected into an opening 60 of the end plate or flange 38 by appropriate connection means. This may be by a pipe having a threaded connection into the trunk line 20 (or to a fitting on the line) and a tightly press-fit connection into the end plug 38, if the member 38 is elastomeric. If the member 38 is metal, it may be threaded, and a connector 62 having threads on one end may be used as part of a connection between the two gas conduits 16 and 20. Because relatively low pressure is involved in the gas withdrawal system, and because both the trunk line 20 and the end of the beam 16 are stably supported on a firm surface such as the concrete rim of a tank, the connection by the member 62 can be made via press-fit, if desired, without threads. FIG. 4 shows a clamp coupling 64, of the type used on no-hub domestic sewer pipe, connecting the member 62 together with a fitting 66 on the line 20.

Figure 5:
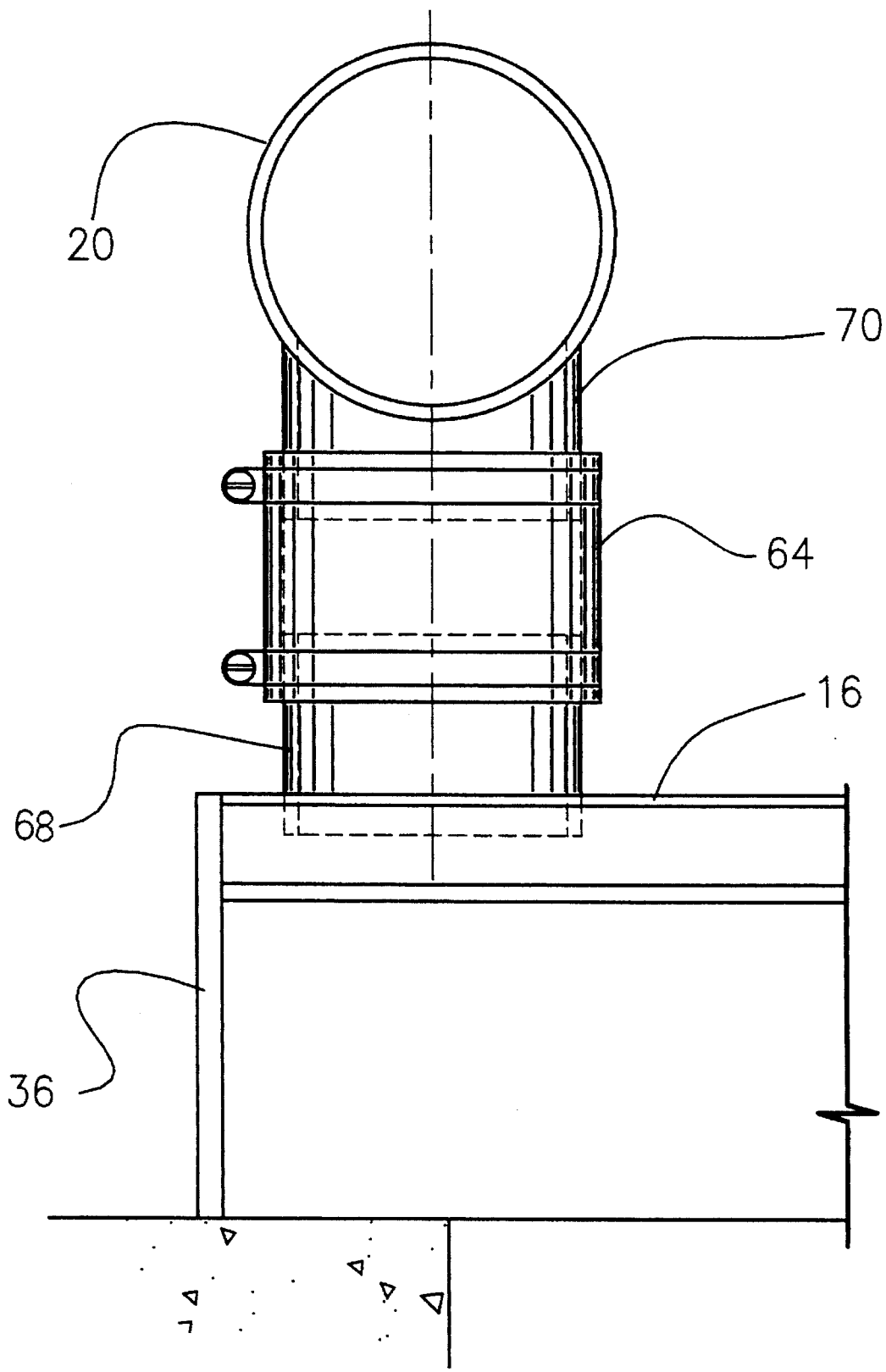

FIG. 5 shows an alternative arrangement wherein the distribution line 20 is positioned above the end of the hollow structural beam 16. A closure plate 36 is affixed to the end of the beam 16, to seal it against leakage, and this can be the same as the closure plate on the other end of the beam (see FIG. 2). Again, this can be an aluminum plate welded onto the end of an aluminum beam, a plate screwed into place with an appropriate gasket, or a tightly press-fit elastomeric member which is resistant to UV radiation. The air distribution line 20 is connected into the top surface of the structural beam 16 by a connector 68 which may be similar to the connector 62 shown in FIG. 4; that is, it can be a pipe nipple with reverse threads at one end, it can be threaded to one of the tubes 20 or 16 and press-fit into the other, or it could be press-fit through elastomeric connections to both the tubes 20 or 16. FIG. 5 shows a clamp coupling 64, as in FIG. 4, used to connect the connector 68 to a fitting 70 on the line 20.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A tank cover structure spanning over a tank adapted to contain a liquid, the tank cover structure forming a substantially gas-tight cover over the tank and including a noxious gas withdrawal system for exhausting gases associated with liquid or processes in the tank, comprising:

at least one tank cover having one or more structural beams spanning across at least a portion of the distance spanned by the tank cover and supporting at least a portion of the tank cover, the beam having a closed, generally tubular cross section, gas withdrawal means connected to at least some of said beams so as to establish fluid communication with the interior of the beam, and openings in the beam at selected locations, said openings communicating with the interior of the tank above the liquid.

2. The apparatus of claim 1, wherein the openings are located in at least one lateral side of the tubular cross section beam.

3. The apparatus of claim 1, wherein the beam of the tank cover is substantially rectangular in cross sectional shape.

* * * * *